United States Patent

[11] 3,578,244

| | | |
|---|---|---|
| [72] | Inventor | Lennart G. Erickson<br>San Mateo, Calif. |
| [21] | Appl. No. | 815,596 |
| [22] | Filed | Apr. 14, 1969 |
| [45] | Patented | May 11, 1971 |
| [73] | Assignee | The Goodyear Tire & Rubber Company<br>Akron, Ohio |

[54] INTERMITTENT SPRINKLER IRRIGATION SYSTEM
6 Claims, 8 Drawing Figs.

[52] U.S. Cl. .................................................... 239/1,
239/69, 239/212
[51] Int. Cl. ..................................................... A01g 25/02
[50] Field of Search ........................................... 239/1, 66,
67, 69, 70, 99, 212, 213, 191, 551, 177;
137/624.18, 624.19, 624.2

[56] References Cited
UNITED STATES PATENTS

| | | | |
|---|---|---|---|
| 2,085,916 | 7/1937 | Marra ............................ | 239/69X |
| 3,140,720 | 7/1964 | Griswold ....................... | 239/70X |
| 3,360,200 | 12/1967 | Purtell ........................... | 239/213 |
| 3,400,891 | 9/1968 | Mattwell ....................... | 239/69X |
| 3,420,270 | 1/1969 | Neyer ............................ | 239/66X |

FOREIGN PATENTS

| | | | |
|---|---|---|---|
| 244,747 | 5/1963 | Australia ....................... | 239/66 |

Primary Examiner—M. Henson Wood, Jr.
Assistant Examiner—John J. Love
Attorney—Townsend and Townsend ABSTRACT: Irrigation apparatus and method utilizing substantially constant waterflow through a lateral and sequential operation of sprinkler heads mounted on and in selective fluid communication with the lateral to provide cyclic irrigation at each of a number of operative locations along the lateral. The constant waterflow and sequential operation of the heads allows for reductions in cross section of the lateral and permits fewer but larger heads to be used, whereby equipment costs are reduced and greater land areas can be irrigated. The heads are selectively placed in fluid communication with the lateral by the use of remotely controlled valves.

Patented May 11, 1971
3,578,244
3 Sheets-Sheet 1
FIG.1
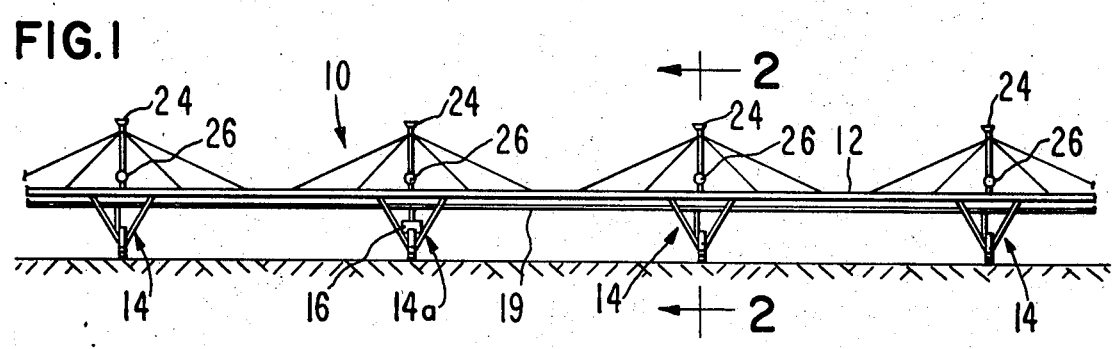
FIG.2
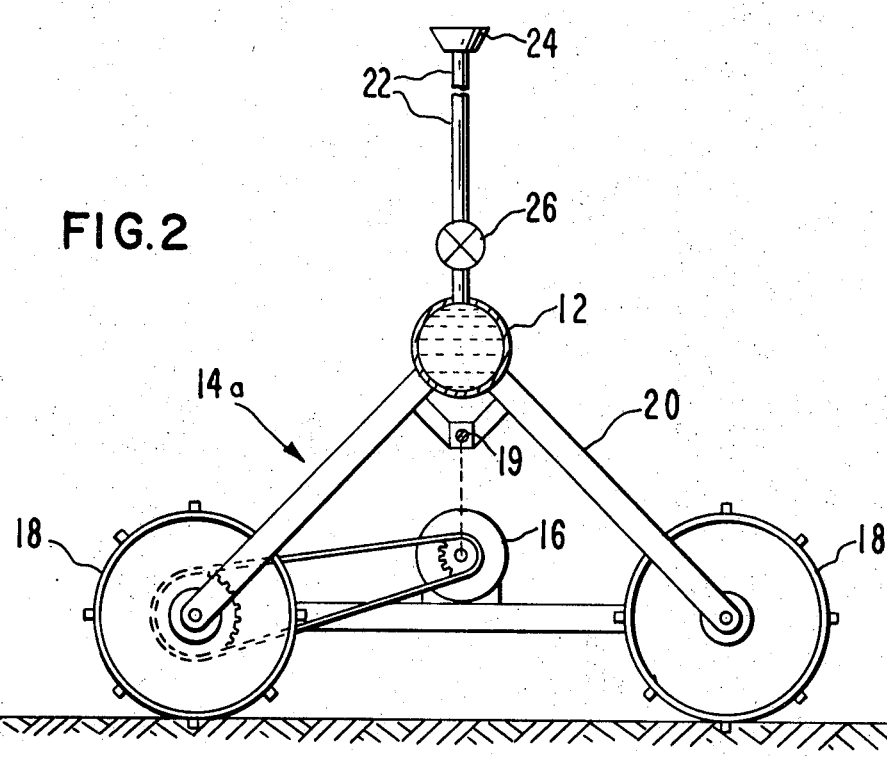
FIG.3
INVENTOR.
LENNART G. ERICKSON
BY
Townsend and Townsend
ATTORNEYS INVENTOR.
LENNART G. ERICKSON
BY Townsend and Townsend
ATTORNEYS INVENTOR.
LENNART G. ERICKSON
BY Townsend and Townsend
ATTORNEYS

INTERMITTENT SPRINKLER IRRIGATION SYSTEM

This invention relates to improvements in irrigation techniques and, more particularly, to an apparatus and method for cyclically irrigating a field with a number of sprinkler heads.

Conventional methods of irrigation generally rely on constant waterflow through a lateral for long periods of time, such as of the order of 12 to 20 hours, to direct water simultaneously through the various heads connected to and in fluid communication with the lateral. Such irrigation technique has not been as satisfactory to achieve optimum irrigation as has been the technique of cyclic irrigation wherein water at an increased volume is sprinkled intermittently onto a field. The basis of the improvement resulting from this practice is the fact that infiltration of water into the soil is considerably greater for intermittent operation than it is for the situation where water is applied on a continuous basis. A higher infiltration rate permits more water application during an irrigation shift or set and this feature, in turn, permits less frequent irrigation sets for a given piece of land.

A primary advantage of less frequent irrigation sets is that a greater area of land can be irrigated with available irrigation equipment than would be capable when the equipment is used with the constant waterflow technique. In this way, each particular area to be watered can be supplied with that amount of water needed under particular circumstances by selection of the time interval during which the water is applied.

This "on-off" concept of irrigation is disclosed in copending Pat. application Ser. No. 767,955, entitled, Method and Apparatus for Sprinkler Irrigation, filed Oct. 16, 1968. In this disclosure, the advantages of the aforesaid concept are set forth and specific examples of infiltration rates for the same type of soil have been shown as a comparison between conventional sprinkler irrigation methods and for the "on-off" method of sprinkler irrigation.

While the "on-off" method represents a significant improvement over conventional methods, it generally requires a relatively high volume rate of flow of water through a lateral to achieve the desired results, especially where the infiltration rate of the soil is relatively low. To achieve the relatively large volume rate of flow, the cross section of the lateral must be relatively large to pass the water. Typically, a high volume rate of flow is 1,000 gallons per minute. To provide a large pipe for use as a lateral increases the cost of the irrigation equipment and increases the requirements for mechanical power which is needed to move the equipment from one area of a field to another.

The present invention provides apparatus and a method for sprinkler irrigation wherein constant flow of water through a lateral can be utilized, yet the advantages of cyclic irrigation of soil can be realized. The constant waterflow temperature eliminates shutdown time due to changeover between sprinkler heads. The cyclic irrigation feature permits fewer but larger heads to be used so that the cross section of the lateral can be smaller than ordinarily required to utilize the "on-off" concept and the heads, because of their increased size, can sprinkle larger areas of soil than has heretofore been capable. In this invention, the "on-off" feature can be realized by selectively placing the heads in fluid communication with the lateral by the use of remotely controlled valves whose operation can be programmed in a simple manner to provide sprinkling coverage in accordance with any desired sequence.

By reducing the size of a lateral, significant equipment costs can be realized and the weight of the lateral will be less. Thus, less mechanical power is needed to move the lateral over a field. Moreover, sequential operation of the sprinkler heads with constant waterflow through the lateral is a more practical expedient than is the use of intermittent flow of water through the lateral to effect the "on-off" method of sprinkler irrigation. Moreover, this feature allows the heads to be divided into groups with the groups being programmed so that, as one group of heads is in operation, the other groups of heads are inoperative. The available waterflow is thereby distributed through relatively few heads and, for this reason, the heads can have a relatively large capacity so as to provide a sprinkling pattern of a much larger extent than is capable with the use of conventional irrigation methods.

Another feature of the arrangement of the heads allows for greater overlapping of the sprinkler patterns of adjacent heads. Thus, the areas covered by the patterns are more uniformly sprinkled and can be watered from opposite directions to compensate for distortions in the patterns due to wind conditions.

A further advantage of using relatively large heads is that that cyclic irrigation reduces the average water application rate. Thus, a lateral need be moved typically only once per day. This is to be contrasted with the use of conventional irrigation methods which generally require that a lateral be moved twice a day to avoid flooding.

The teachings of the present invention can be utilized with both stationary and movable laterals. Moreover, by suitable valving techniques, the motive force required to move the lateral can be responsive to the waterflow through the lateral itself. Such a structure is disclosed in the above copending application.

The primary object of this invention is to provide improvements in irrigation techniques wherein a constant water flow through a lateral can be utilized, yet the advantages of "on-off" sprinkler irrigation can be realized so that relatively small, generally inexpensive pipe can be used for the lateral while, at the same time, optimum watering of the soil can be achieved.

Another object of this invention is to provide apparatus and a method of sprinkler irrigation wherein a plurality of sprinkler heads are sequentially operated as waterflows continuously through a lateral to which the heads are coupled so that specific areas of soil can be watered periodically in accordance with the characteristics of the soil and to satisfy specific crop and other requirements.

A further object of this invention is to provide an apparatus and method of the type described wherein the cyclical operation of the spray heads allows for fewer heads to be in operation at any one time to thereby permit heads of greater capacity to be used so that larger areas of soil can be covered than has heretofore been capable with the use of conventional irrigation methods.

Still another object of this invention is to provide apparatus and a method of the aforesaid character wherein the arrangement of the sprinkler heads allows for greater overlapping of sprinkler patterns of adjacent heads for more uniform coverage and permits the spray to be applied to each area of soil from opposite directions to compensate for distortions of sprinkler patterns due to wind conditions.

Other objects of this invention will become apparent as the following specification progresses, reference being had to the accompanying drawings for an illustration of an embodiment of the apparatus.

In the drawings:

FIG. 1 is an elevational view showing a portion of the apparatus as it is in a position for irrigating a field;

FIG. 2 is an enlarged, cross-sectional view taken along line 2–2 of FIG. 1 and showing a sprinkler head and its valve on a lateral;

FIG. 3 is an enlarged fragmentary, top plan view of the apparatus, illustrating the way it is connected to a water main;

Figure 4A:
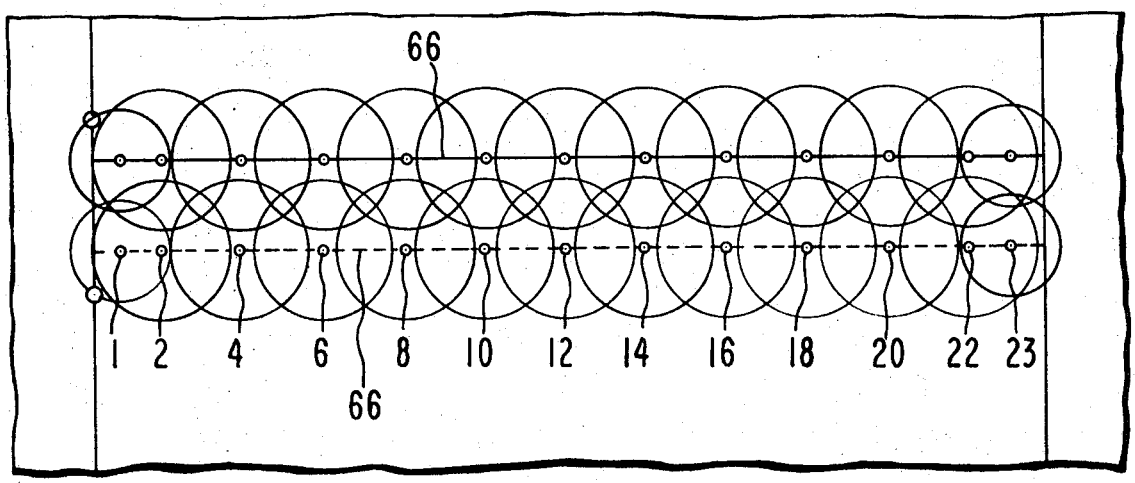
FIG. 4a is a graphic view of a portion of a field and illustrating the sprinkler pattern provided by conventional sprinkler irrigation apparatus.

The apparatus of this invention is broadly denoted by the numeral 10 and is illustrated in a schematic form in FIG. 1. Apparatus 10 includes a lateral 12 which is to extend substantially across the width of a field to be irrigated by sprinkling. The lateral is supported above ground by a series of mobile carriers 14 which are all generally of the same construction.

Each carrier can be of any construction but, as shown in FIG. 2, it includes a spaced pair of ground-engaging wheels 18 coupled to a frame 20 in the shape of an A-frame. Frame 20 is disposed to support lateral 12 as shown in FIG. 2 and any suitable means can be used to connect the lateral to or otherwise hold the same on frame 20. Associated with each carrier is a riser pipe 22 which communicates with lateral 12 and extends upwardly therefrom generally in the vicinity of the corresponding carrier. Each riser pipe 22 has sprinkler head 24 at its upper end for sprinkling water in a predetermined pattern with respect to the lateral. While one form of the head has been shown in FIG. 2, it is clear that other forms of the head can be used, if desired, or if needed, to meet specific pattern requirements.

Since lateral 12 is to be periodically moved lengthwise of the field to be irrigated, means is provided to move carriers 14 together. While several different ways can be selected for effecting carrier movement, one way of doing this is to provide one of the more centrally disposed carriers 14a with a suitable power drive, such as a motor 16 (FIG. 2) for driving its wheels 18 and then to provide shaft structure 19 operated from motor 16 and coupled to the wheels of the other carriers 14 for moving the latter as carrier 14a moves. In this way, lateral 12 will move uniformly with respect to the ground so that sprinkler heads 24 coupled to the lateral will, at all times, be in proper locations relative to each other to provide a desired sprinkler pattern for the entire width of the field.

An electrically actuated fluid valve 26 is coupled to each riser pipe 22, respectively, for controlling the flow of water therethrough. A valve 26 alternately opens and closes its riser pipes 22 and, when it opens the latter, it places the riser pipe and thereby the corresponding head 24 in fluid communication with lateral 12. Valves 26 are controlled remotely from their locations on the riser pipes and their actuation is preferably programmed in accordance with a predetermined sequence in a manner hereinafter described.

Lateral 12 is coupled to a source of water under pressure so that water can issue from heads 24 in accordance with the aforesaid program to provide sprinkler patterns which are sufficient to result in the desired irrigation of the field on which apparatus 10 is used. For purposes of illustration, lateral 12 is releasably connected at one end thereof to a riser pipe 28 FIGS. 3 and 4b at the side of the field. Pipe 28 is connected to an underground water main 30 which extends lengthwise of the field and is connected to a suitable source of water under pressure such as a water pump in communication with a water well. Again, for purposes of illustration, lateral 12 and riser pipe 28 have mating flanges 32 and 34, respectively, which are releasably coupled together in any suitable manner whereby lateral 12 can receive water from main 30. A valve (not shown) is associated with riser pipe 28 to control the waterflow therethrough, there being a riser pipe 28 for each of a plurality of locations, respectively, along main 30.

Figure 5:
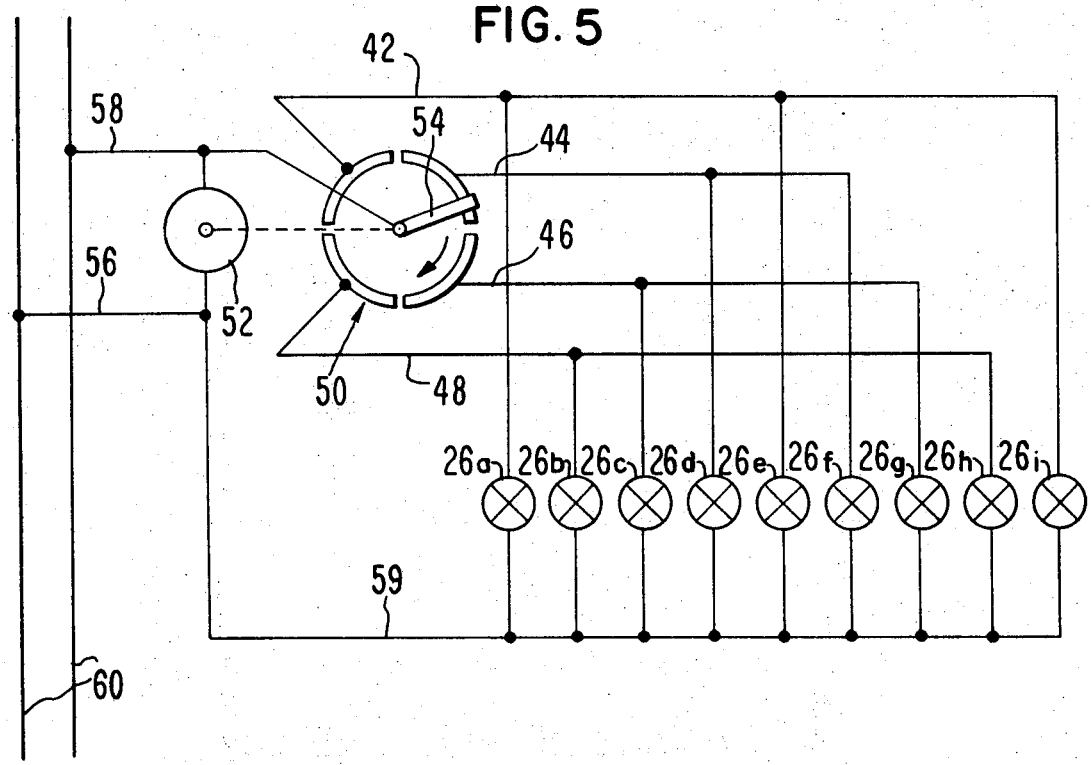
FIG. 5 is a schematic wiring diagram showing the programming of the control valves for the sprinkler heads.
Figure 6:
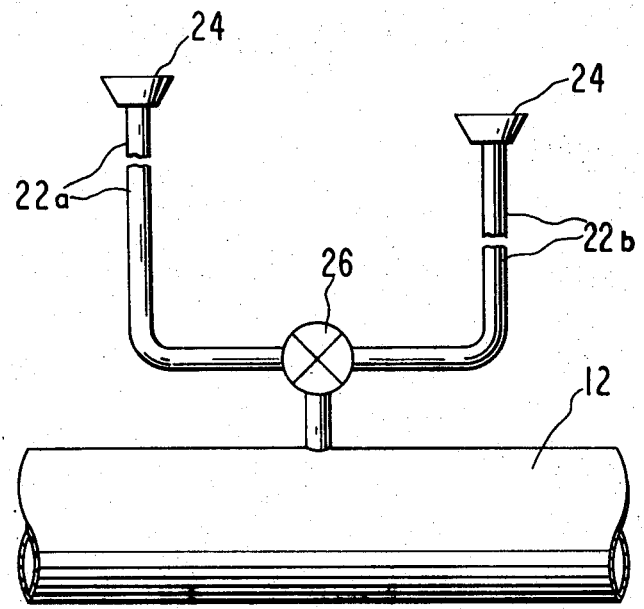
FIG. 6 is an enlarged, fragmentary elevational view of another embodiment of the valve-head combination of a lateral.

FIG. 3 further illustrates a valve 26 and the electrical conductor means 36 connecting the valve to an electrical power source 38 adjacent to the side of the field near riser pipe 28. A program device 40 associated with power source 38 is used to selectively apply electrical power to the plurality of valves 26 in accordance with a predetermined sequence. FIG. 5 shows one form of electrical circuitry constructed to achieve this end. Conductor means 36 is coupled to all of the valves 26 and includes a number of conductors 42, 44, 46 and 48 connected to a commutator ring 50. A motor 52 operates the movable contact 54 of ring 50 and a pair of leads 56 and 58 connect contact 54 and a lead 59 common to all of the valves to an electrical power source defined by a pair of power leads 60. Conductors 42—48 are coupled to respective valves 26 and motor 52 includes structure for actuating it periodically to thereby advance contact 54 from one commutator segment to the next segment. Thus, the motor, its actuating structure, and the commutator ring will define program device 40.

Figure 4B:
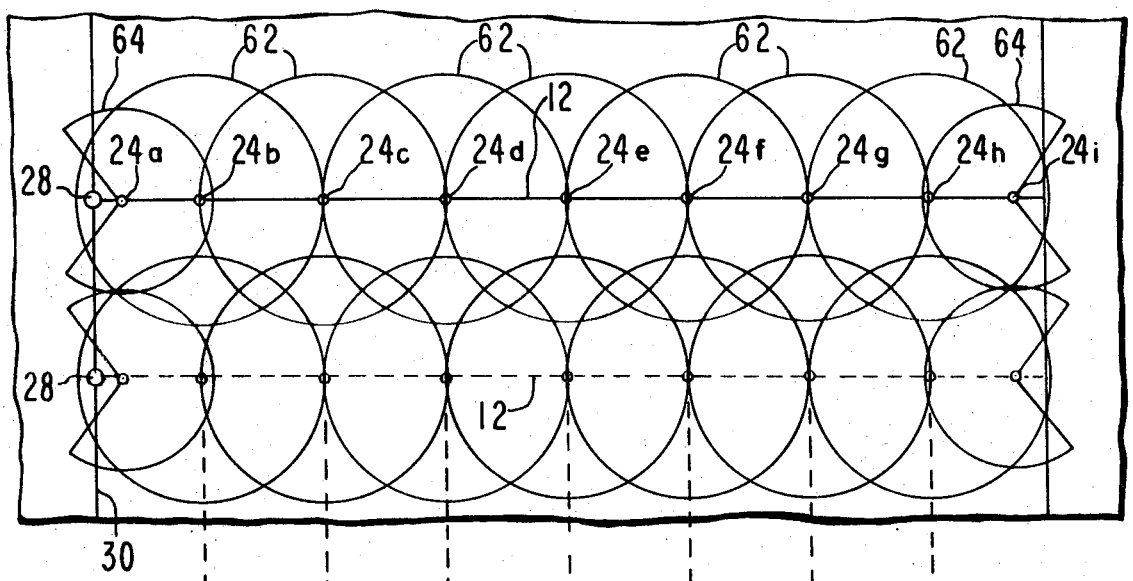
FIG. 4b is a view similar to FIG. 4a but showing the sprinkler pattern provided by the apparatus of this invention.

In FIG. 4b, lateral 12 is shown in two different operative locations along a field. At one location, the lateral is shown in full lines and, at the next succeeding location, it is shown in dashed lines. In both locations, the lateral is shown diagrammatically as being connected to water main 30 at one side of the field. For purposes of illustration, the field is one-quarter mile wide and can be of any length, the lateral being shown as extending substantially across the entire width of the field. Water main 30 has a number of riser pipes 28 located at fixed distances from each other, the distance, for purposes of illustration, being 240 feet. Nine sprinkler heads are shown along the length of the lateral. Seven of the heads intermediate the sides of the field provide circular sprinkler patterns 62 while the remaining two heads adjacent to respective sides of the field provide generally semicircular patterns 64. The sprinkler heads are denoted by the numerals 24a, 24b, 24c, 24d, 24e, 24f, 24g, 324h and 24i with heads 24a and 24i being at the end locations of the lateral.

Figure 4C:
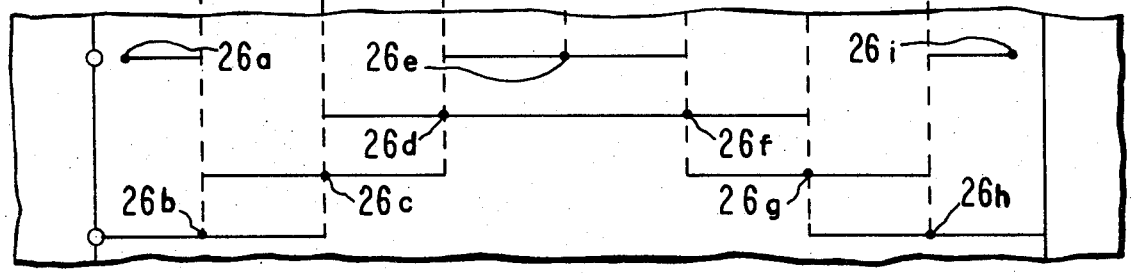
FIG. 4c is a timing pattern to illustrate the periods of operation of the sprinkler heads of this invention.

In FIG. 4c, the timing sequence is shown to illustrate the operation of the valves for the heads. The sequence is divided into four intervals and, for purposes of illustration, these intervals are equal in length and involve sprinkler heads at different locations. For the first time interval, the valves corresponding to heads 24a, 24e and 24i are simultaneously open. These valves are denoted as 26a, 26e and 26i in FIGS. 4c and 5. Thus, water issues from the last-mentioned heads while the other heads remain inoperative. The lengths of the lines relating to these three heads in FIG. 4c indicate the maximum distances which the sprinkler patterns of the heads are able to reach during an operative interval. In the second timing interval, heads 24d and 24f are in operation upon opening of corresponding valves 26d and 26f. During this interval, the other heads remain inoperative. In the third interval, heads 24c and 24g are in operation upon actuation of corresponding valves 26b and 26g. Finally, in the fourth time interval, heads 24b and 24h are in operation upon actuation of corresponding valves 26b and 26h. For 1-hour cycles, the intervals are 15 minutes long for each group of heads. From FIG. 4c, it can be seen that each area of a field is sprinkled for a total of 30 minutes and remains unsprinkled for a total of 30 minutes. Moreover, the arrangement of the heads and the sequence of their operation allow sprinkling of each area from opposite directions so as to compensate for distortions of the spray patterns due to wind conditions.

FIG. 4c also shows the overlapping of spray pattern 62 corresponding to the two locations of lateral 12 along the field. The patterns overlap sufficiently to provide uniform sprinkling of the field. For other operative locations of the lateral, the corresponding spray patterns will overlap in the manner of FIG. 4b. foot as the lateral progresses lengthwise of the field, the various areas of the field will be uniformly sprinkled. For purposes of illustration, the time required for the lateral to advance the length of a quarter section in 240-foot increments is 11 days and the lateral will be at each operative location for a period of approximately 24 hours. For each 1-hour cycle of operation, the heads will operate in accordance with the sequence of FIG. 4c. This sequence is achieved with the circuitry of FIG. 5 wherein the various valves are selectively actuated by the sequential advancement of contact 54 to successive commutator segments. At each operative location, the lateral is connected to the corresponding riser pipe 28 and the waterflow is commenced through the lateral and outwardly from those heads whose valves are open.

The arrangement of heads 24 on lateral 12 as shown in FIG. 4b and the timing sequence of valve operation as shown in FIG. 4c allow for constant waterflow through a lateral of relatively small cross section while utilizing the advantages of the aforesaid "on-off" concept of sprinkler irrigation. Thus, heads 24 can be of relatively large capacity so as to sprinkle greater areas while fewer heads can be used to sprinkle a given area. The use of remotely controlled valves in the manner described above with the various heads permits constant water flow through the lateral so that shutdown time due to switching from one group of heads to another is completely eliminated.

By comparison, conventional sprinkling irrigation apparatus requires a greater number of lower capacity heads since the spray patterns of the heads cover relatively small areas. Thus, more heads are needed to sprinkle a given area so as to provide for proper overlapping of the patterns to achieve uniform irrigation. The spray pattern from a typical irrigation apparatus of conventional construction is shown in FIG. 4a for the same width of a field to be irrigated wherein it can be seen that the lateral 66 (shown in full and dashed lines, respectively) which advances incrementally along a field can do so only in relatively short steps, of the order of 120 feet. FIG. 4a shown a typical arrangement of 13 relatively small heads which operate continuously, during an irrigating set, to distribute about the same quantity of water as distributed by the FIG. 4b improved system of the present invention, in which only two or three larger heads are in operation at any time. The land area irrigated in the conventional system of FIG. 4a, over a period of several hours, is only about half that of the improved FIG. 4b system; therefore, the average rate of water application per unit area of land being irrigated is about double that of the improved FIG. 4b system. It is apparent that the conventional system, FIG. 4a, must be moved twice as often to irrigate comparable land areas with comparable total amounts of water. Thus, the labor required for operation of the improved FIG. 4b system is about half that required for conventional systems.

In the operation of apparatus 10, lateral 12 with heads 24a through 24i thereon is placed on the field and the lateral is connected to the side main 30 through one of the riser pipes 28. The commutator 50 is set to actuate the valves in accordance with a predetermined sequence, such as that of FIG. 4c and the waterflow is commenced through the lateral. Thus, heads 24a, 24e and 24i will initially be in operation to cause sprinkling of the corresponding areas thereof as shown in FIG. 4b. These heads will be turned on when their respective valves 26a, 26e and 26i are actuated and will effect sprinkling for a certain period of time, following which the valves of the heads will be closed and the valves of the next group of heads will be actuated. The sprinkling continues for the second time interval and so on until a cycle has been completed. The cycle commences over again and a plurality of cycles are completed for each location of the lateral before the lateral is moved to its next location. A typical time period for each location is 24 hours.

To move the lateral, it is first disconnected from the riser pipe at one location and advanced to the next location for connection with the corresponding riser pipe 28. The lateral is moved when motor 16 on carrier 14a is operated and, assuming that the other carriers are coupled to this one carrier, all the carriers advance together lengthwise of the field to the new location. Prior to advancing the carriers, the lateral will be drained in some suitable manner to minimize the weight of the lateral.

At the new location, the lateral is again coupled to the side main and waterflow again commences through the lateral. The sequence of FIG. 4c is repeated for each of a plurality of cycles at the new location. This procedure is continued until the lateral has advanced along the length of the field and, for a spacing of 240 feet between operative locations of the lateral, a quarter section of land can be covered in approximately 11 days.

While a specific number of heads and a particular sequence of operation of the heads has been described, it is to be understood that the number of usable heads and the operating sequence thereof can be varied as desired. Thus, it is possible that only one head may be in operation at any one time and the duration of operation of one head may be different from that of another head of the apparatus.

I claim:

1. Intermittent sprinkler irrigation apparatus for irrigating a field comprising: a lateral for conveying water along a predetermined path; wheel means mounting the lateral above ground for movement in a direction transversely of said path into any one of a plurality of operative positions along the length of a field to be irrigated; means coupled with said wheel means for moving the latter in said direction to thereby permit movement of the lateral successively into a number of operative positions; a plurality of pipes in fluid communication with and extending transversely from said lateral at spaced locations along the length thereof; a sprinkler head for each pipe, respectively, the sprinkler heads being coupled to respective pipes for receiving water therefrom and being adapted for sprinkling water onto the field beneath the lateral; an actuatable valve for each pipe, respectively, each valve being coupled with the respective pipe for controlling the flow of water therethrough; and means coupled with the valves for successively actuating the same in groups in accordance with a predetermined sequence when said lateral is in any one of said operative positions, whereby less than all of the valves will be actuated at a given time to provide for intermittent sprinkling of respective areas of the field.

2. Apparatus as set forth in claim 1, wherein said actuating means is remote from the valves and includes a program device to provide said sequence of actuation of the valves.

3. A system as set forth in claim 1, wherein said actuating means includes a program device having a commutator ring provided with a movable contact, and a drive motor for operating said movable contact, said valves being operably coupled with said commutator ring.

4. A method of irrigating a field by intermittently sprinkling the same comprising: providing a primary fluid path at a first operative position above ground in a field to be irrigated, providing a plurality of secondary fluid paths in fluid communication with the primary path; directing a flow of water along said primary path; opening and closing said secondary paths in accordance with a predetermined sequence in which less than all of the second paths are open at any one time to thereby cause intermittent flow of water from each secondary path as water continues to flow along the primary path; stopping the flow of water along the primary path, moving the primary path transversely of its length into a second operative position spaced laterally from said first operative position; directing a flow of water along said primary path when the latter is in said second operative position; and opening and closing the secondary paths in accordance with said predetermined sequence.

5. A method as set forth in claim 4, wherein the step of directing a flow of water along said primary path includes placing the same in fluid communication with a water main.

6. A method as set forth in claim 4, wherein the opening and closing of the secondary paths are controlled from a location remote therefrom.